United States Patent
Brannon et al.

(10) Patent No.: US 7,699,106 B2
(45) Date of Patent: Apr. 20, 2010

(54) METHOD FOR REDUCING FLUID LOSS DURING HYDRAULIC FRACTURING OR SAND CONTROL TREATMENT

(75) Inventors: Harold Dean Brannon, Magnolia, TX (US); D. V. Satyanarayana Gupta, The Woodlands, TX (US); Roger R. Myers, Cranberry Township, PA (US); Brian Benedict Beall, Spring, TX (US)

(73) Assignee: BJ Services Company, Houston, TX (US)

( * ) Notice: Subject to any disclaimer, the term of this patent is extended or adjusted under 35 U.S.C. 154(b) by 414 days.

(21) Appl. No.: 11/706,030

(22) Filed: Feb. 13, 2007

(65) Prior Publication Data
US 2008/0190619 A1    Aug. 14, 2008

(51) Int. Cl.
*E21B 43/26* (2006.01)
(52) U.S. Cl. ............... 166/283; 166/282; 166/308.2
(58) Field of Classification Search .......... None
See application file for complete search history.

(56) References Cited

U.S. PATENT DOCUMENTS

| | | | |
|---|---|---|---|
| 4,591,447 A | 5/1986 | Kubala |
| 4,615,825 A | 10/1986 | Teot et al. |
| 4,695,389 A | 9/1987 | Kubala |
| 4,725,372 A | 2/1988 | Teot et al. |
| 4,869,960 A | 9/1989 | Gibb et al. |
| 4,964,295 A | 10/1990 | Nottingham et al. |
| 5,258,137 A | 11/1993 | Bonekamp et al. |
| 5,551,516 A | 9/1996 | Norman et al. |
| 5,964,295 A | 10/1999 | Brown et al. |
| 5,979,557 A | 11/1999 | Card et al. |
| 5,981,447 A | 11/1999 | Chang et al. |
| 6,011,075 A | 1/2000 | Parris et al. |
| 6,059,034 A | 5/2000 | Rickards et al. |
| 6,172,011 B1 | 1/2001 | Card et al. |
| 6,302,209 B1 | 10/2001 | Thompson, Sr. et al. |
| 6,330,916 B1 | 12/2001 | Rickards et al. |
| 6,364,018 B1 | 4/2002 | Brannon et al. |
| 6,399,546 B1 | 6/2002 | Chang et al. |
| 6,410,489 B1 | 6/2002 | Zhang |
| 6,435,277 B1 | 8/2002 | Qu et al. |
| 6,468,945 B1 * | 10/2002 | Zhang ............... 507/240 |
| 6,491,099 B1 | 12/2002 | Di Lullo Arias et al. |
| 6,508,305 B1 | 1/2003 | Brannon et al. |
| 6,703,352 B2 | 3/2004 | Dahayanake et al. |
| 6,729,408 B2 | 5/2004 | Hinkel et al. |
| 6,749,025 B1 | 6/2004 | Brannon et al. |
| 6,776,235 B1 | 8/2004 | England |

(Continued)

FOREIGN PATENT DOCUMENTS

WO    WO 2004/083600 A1    9/2004

*Primary Examiner*—Zakiya W Bates
*Assistant Examiner*—Angela M DiTrani
(74) *Attorney, Agent, or Firm*—John Wilson Jones; Jones & Smith, LLP

(57) ABSTRACT

A low viscosity fluid for reducing fluid loss in a relatively low permeability formation has a viscosity of less that 10 CP and contains a low molecular weight viscosifying agent The aqueous medium may be fresh water, salt water, brine or slickwater. The invention has particular applicability when an ultra lightweight (ULW) proppant or sand control particulate is employed. The fluid may be used in reservoirs having a relative permeability less than 10 mD.

22 Claims, 1 Drawing Sheet

U.S. PATENT DOCUMENTS

| | | |
|---|---|---|
| 6,828,280 B2 | 12/2004 | England et al. |
| 6,849,581 B1 | 2/2005 | Thompson et al. |
| 6,875,728 B2 | 4/2005 | Gupta et al. |
| 6,929,069 B2 | 8/2005 | Hinkel et al. |
| 6,929,070 B2 | 8/2005 | Fu et al. |
| 7,036,585 B2 | 5/2006 | Zhou et al. |
| 7,398,829 B2 * | 7/2008 | Hutchins et al. ......... 166/308.3 |
| 2003/0054962 A1 * | 3/2003 | England et al. ............. 507/117 |
| 2004/0040708 A1 | 3/2004 | Stephenson et al. |
| 2004/0138071 A1 | 7/2004 | Gupta et al. |
| 2004/0173354 A1 | 9/2004 | Hinkel et al. |
| 2005/0016732 A1 | 1/2005 | Brannon et al. |
| 2005/0028979 A1 * | 2/2005 | Brannon et al. .......... 166/280.2 |
| 2005/0107265 A1 | 5/2005 | Sullivan et al. |
| 2005/0189879 A1 | 9/2005 | Minamoto et al. |
| 2005/0245401 A1 | 11/2005 | Chan et al. |
| 2005/0274523 A1 | 12/2005 | Brannon et al. |
| 2006/0065398 A1 | 3/2006 | Brannon et al. |
| 2006/0264334 A1 | 11/2006 | Gupta et al. |
| 2007/0087941 A1 | 4/2007 | Cawiezel |

* cited by examiner

METHOD FOR REDUCING FLUID LOSS DURING HYDRAULIC FRACTURING OR SAND CONTROL TREATMENT

FIELD OF THE INVENTION

The invention relates to methods and compositions for reducing fluid loss in a relatively low permeability formation.

BACKGROUND OF THE INVENTION

Hydraulic fracturing requires the use of well treating materials capable of enhancing the production of fluids and natural gas from low permeability formations. In a typical hydraulic fracturing treatment, fracturing treatment fluid containing a solid proppant is injected into the formation at a pressure sufficiently high enough to cause the formation or enlargement of fractures in the reservoir. The proppant is deposited in the fracture, where it remains after the treatment is completed. After deposition, the proppant serves to hold the fracture open, thereby enhancing the ability of fluids or natural gas to migrate from the formation to the wellbore through the fracture.

Many different materials have been used as proppants including sand, glass beads, walnut hulls, and metal shot as well as resin-coated sands, intermediate strength ceramics, and sintered bauxite; each employed for their ability to cost effectively withstand the respective reservoir closure stress environment. The relative strength of these various materials increases with their corresponding apparent specific gravity (ASG), typically ranging from 2.65 for sands to 3.4 for sintered bauxite. Unfortunately, increasing ASG leads directly to increasing degree of difficulty with proppant transport and reduced propped fracture volume, thereby reducing fracture conductivity.

Another common problem in fracturing operations is the loss of fracturing fluid into the porous matrix of the formation. The loss of fracturing fluid into the formation has an effect on the fracture size and geometry created during the operation. The efficiency of fracturing fluids containing conventional proppants is enhanced (or fluid loss is mitigated) by thickening of the fracturing fluid. Thickening of the fracturing fluid enables it to carry proppant into the fracture.

Bridging solids are typically used to increase the viscosity of the fracturing fluid. Bridging solids are typically either viscosifying polymers, such as insoluble starches, or sized particulate solids such as silica flour or calcium carbonate.

The viscosity of the fracturing fluid filtrate leaked into the rock matrix affects the rate of fluid loss since increased viscosity of the fluid flowing within the matrix creates resistance. In conventional polymer-based fracturing fluids, this effect is typically ignored since the bridging solids employed are too large to penetrate the rock matrix. Such solids are typically filtered at the rock face, thereby creating a relatively impermeable filter cake. This, in turn, limits the loss of filtrate to the formation. As such, the filtrate penetrating the matrix is non-viscosified brine (typically 2% KCl), having a viscosity similar to that of the formation fluid. No additional resistance to movement within the matrix is needed. Unfortunately, filter cakes are often damaging to the desired conductivity of the proppant pack; in some cases reducing the proppant pack conductivity by over 90%.

More recently, attention has been drawn to the use of ULW materials as proppant materials. ULW materials are often desirable since they reduce the fluid velocity required to maintain proppant transport within the fracture. This, in turn, provides for a greater amount of the created fracture area to be propped open. Such ULW proppants, like conventional heavier proppants, have the capability to effectively withstand reservoir closure stress environments while increasing fracture conductivity.

Utilization of ULW proppants in slickwater fluids has gained favor in reservoirs having permeabilities between 0.001 to 1.0 mD since bridging solids are not needed for viscosification or proppant transport and fluid loss in such tight formations is not significant. Slickwater fluids are basically fresh water or brine having sufficient friction reducing agent to minimize tubular friction pressures. Such fluids have viscosities generally only slightly higher than unadulterated fresh water or brine. Since such slickwater fluids do not contain bridging solids, they do not build a filtercake and thus are considered inherently non-damaging to the proppant pack.

It is desirable to expand the application of slickwater based fluids incorporating ULW proppants in reservoirs having permeabilities greater than 1.0 mD. The use of slickwater fluids containing ULW proppants in higher permeability reservoirs is highly desirable since slickwater is substantially non-damaging to the formation face. In such higher permeability reservoirs, however, it is important that fluid efficiency of slickwater fluids not become compromised since sufficient fluid must remain in the fracture to facilitate continued propagation of the fracture and maintain adequate width for proppant movement. Further, such fluids must be capable of viscosifying without the buildup of filter cake.

SUMMARY OF THE INVENTION

The invention relates to methods and compositions for the reduction of fluid loss in relatively low permeability formations during hydraulic fracturing. The relative permeability of the reservoir is generally less than 10 mD. The invention further has applicability in the reduction of fluid loss in such relatively low permeability formations during sand control methods, such as gravel packing, frac pack treatments, etc.

The low viscosity fluid of the invention contains an aqueous medium and a viscosifying agent (collectively "filtrate") and a proppant or sand control particulate. The filtrate has a viscosity of less than 50 CP at 170 sec$^{-1}$. The low molecular weight viscosifying agent is present in the filtrate in an amount between from about 0.1 to about 10 weight percent. In a preferred embodiment, the weight average molecular weight of the viscosifying agent is less than or equal to 150,000, preferably less than or equal to 100,000.

The particulate is preferably relatively lightweight, such as those ultra lightweight (ULW) particulates having an apparent specific gravity (ASG) of less than or equal to 2.35, preferably less than or equal to 1.75.

In a preferred embodiment, the aqueous medium of the fluid is slickwater.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
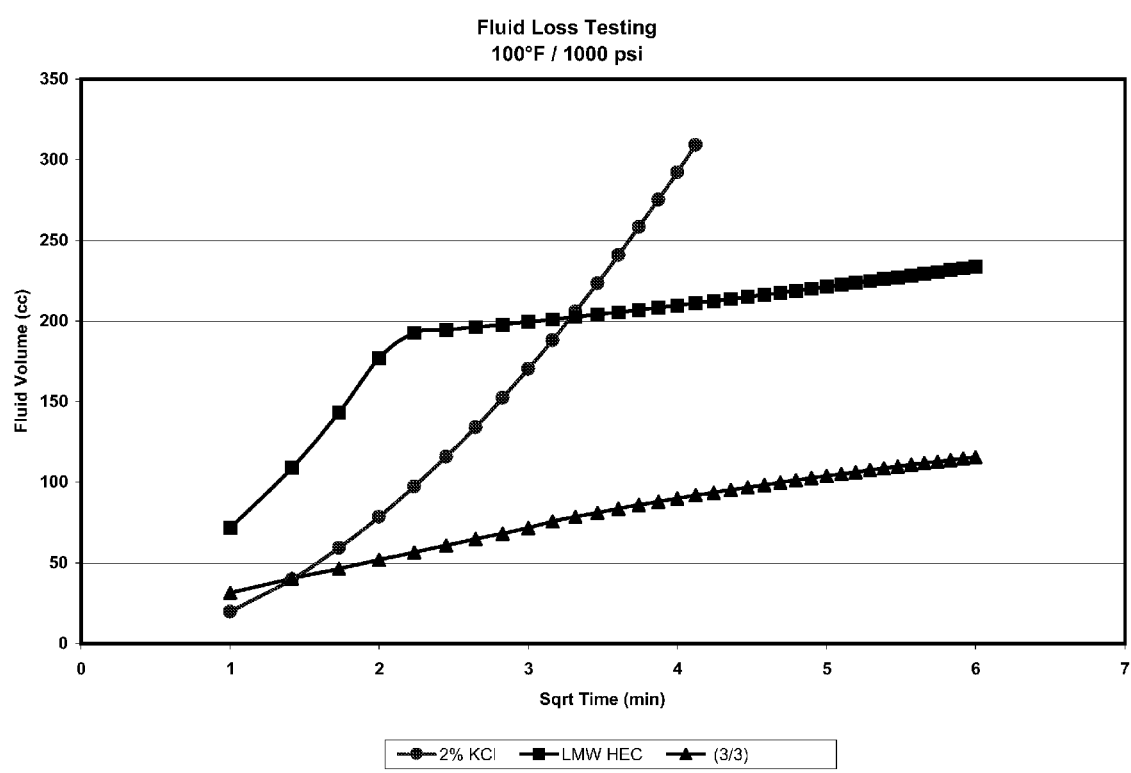
FIG. 1 demonstrates improved fluid loss control with little evidence of filter cake or wall-building character for low viscosity slickwater systems containing low molecular weight viscosifying agents.

The fluid for use in the invention comprises an aqueous medium and a viscosifying agent. In addition, the fluid contains a proppant or sand control particulate. (As used herein, the term "filtrate" refers to that portion of the fluid excluding the proppant or sand control particulate.) The filtrate of the fluid for use in the invention has a viscosity generally less than about 50 CP @ 170 sec$^{-1}$. Typically, the filtrate has a viscosity less than 10 CP.

The viscosity of the filtrate need be only slightly higher than that of the in-situ formation fluids. In a preferred embodiment, the viscosity of the filtrate is generally at least 100 percent greater than the viscosity of the in-situ formation fluids. Typically, the viscosity of the filtrate is greater than about 1 cps but less than about 20 cps, more typically greater than about 2 cps but less than 10 cps. This is in contrast to conventional systems where the viscosity of the filtrate is greater than or equal to 100 cps.

The efficiency of the fluid of the invention is improved by the presence of the viscosifying agent. In essence, the viscosifying agent need only impart a small amount of viscosity to the fluid to successfully practice the invention. Suitable for use as the viscosifying agent is any substance capable of rendering to the filtrate the desired viscosity range and which has a molecular size sufficient to penetrate the pores of the formation such that the filtrate may flow through the porous matrix within the formation. The viscosifying agent is present in the fluid in an amount between from about 0.01 to about 10, preferably between from about 0.05 to about 2, weight percent, based on the total weight of the fracturing fluid.

The viscosifying agent is preferably a low molecular weight polymer or an associative thickener. The weight average molecular weight of the viscosifying agent is typically less than about 250,000, preferably less than 150,000, more preferably less than 100,000.

Preferred viscosifying agents include hydroxyethyl cellulose, carboxymethylhydroxyethyl cellulose, hydroxypropyl cellulose, ethylhydroxyethyl cellulose and carboxymethyl cellulose, polyethylene oxide and depolymerized guar.

Viscoelastic surfactant gels may also be useful for practicing the invention as well. In a preferred embodiment, the viscosifying agent contains an anionic surfactant and a cationic surfactant; more preferably sodium xylene sulfonate and N,N,N-trimethyl-1-octadecammonium chloride, as set forth in U.S. Pat. No. 6,468,945, herein incorporated by reference.

Surfactant gels used in the fluids of the invention are typically present in an amount between from about 10 to 60 gallons per thousand gallons of aqueous fluid. For instance, to render a viscosity of 5 CP at 511 sec$^-$, viscoelastic surfactant gels may be used at concentrations on the order of 5 gallons per thousand gallons of aqueous fluid.

The fluid of the invention is particularly efficacious in the treatment of lower permeability wells, i.e., wells having a permeability of less than 10 mD. In a preferred mode, wells treated in accordance with the invention exhibit a permeability between from less than about 1.0 mD to as high as 10 mD.

The fluid has particular applicability in the treatment of those reservoirs having a relative permeability of less than about 10 mD, preferably about 1.0 mD. It is therefore necessary that the viscosifying agent be of a sufficiently small molecular (hydrodynamic) size to easily flow through the pore throats of the formation and flow through the rock matrix. Thus, the formation of filter cake using the fracturing fluid of the invention is minimized. Likewise, the volume occupied by the viscosifying agent must be sufficiently small to negotiate the pore throats and flow through the rock matrix.

For instance, in order to permeate a 1.0 mD rock matrix, the viscosifying agent should preferably be less than about 0.1 micron in diameter. Thus, any viscosifying agent having a hydrodynamic size of less than 0.1 micron in diameter and imparting viscosity to the fluid may be suitable.

The aqueous medium may be any carrier fluid capable of transporting the particulate into the well such as a completion or workover brine, salt water, fresh water, potassium chloride solution, a saturated sodium chloride solution, liquid hydrocarbons. In a preferred mode, the aqueous medium is fresh water, salt water, brine or slickwater, most preferably slickwater.

The proppant or sand control particulates for use in the fluid may be conventional particulates as well as a relatively lightweight materials. By "relatively lightweight," it is meant that the particulate has an apparent specific gravity (ASG) (API RP60) that is substantially less than that of a conventional particulate material employed in well treating operations, e.g., sand or having an ASG similar to these materials. In particular, the ASG of the relatively lightweight particulate is less than or equal to 3.25. Relatively lightweight particulates may be chipped, ground, crushed, or otherwise processed to produce particulate material having any particle size or particle shape. Typically, the particle size of the particulates employed in the invention may range from about 4 mesh to about 100 mesh.

Preferred relatively lightweight particulates include ceramics, resin coated ceramics, glass microspheres, aluminum pellets or needles, or synthetic organic particulates such as nylon pellets or ceramics.

In a preferred mode, the relatively lightweight particulate is an ultra lightweight (ULW) particulate having an ASG less than or equal to 2.45. Even more preferred are those ULW particulates having an ASG less than or equal to 2.25, preferably less than or equal to 2.0, more preferably less than or equal to 1.75, even more preferably less than or equal to 1.5, most preferably less than or equal to 1.25.

The ULW particulate is preferably selected from a particulate resistant to deformation, including naturally occurring materials, a porous particulate treated with a non-porous penetrating coating and/or glazing material or a well treating aggregate of an organic lightweight material and a weight modifying agent. Mixtures of such particulates may further be used.

The fluids of the invention may be injected into a subterranean formation in conjunction with a hydraulic fracturing treatment or other treatment at pressures sufficiently high enough to cause the formation or enlargement of fractures, or to otherwise expose the particles to formation closure stress. Such other treatments may be near wellbore in nature (affecting near wellbore regions) and may be directed toward improving wellbore productivity and/or controlling the production of fracture proppant or formation sand. Particular examples include gravel packing and "frac-packs."

In one exemplary embodiment, a gravel pack operation may be carried out on a wellbore that penetrates a subterranean formation. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. The fluid of the invention may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the fluid may contain all or only a portion of the particulates. In the latter case, the balance of the particulate material may be another material, such as a conventional gravel pack or sand control particulate.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

A fluid loss test was performed at 100° F. and on a 10 mD Berea core measuring 2 inches in length and 1 inch in diameter. The cores were loaded with the test fluid and sealed into a fluid loss cell. Approximately 1,000 lbs of pressure was applied to the top of the cell. The cell was then opened at the top. The bottom valve was also opened, thereby forcing the fluid to flow through the sealed core. The amount of fluid exiting the cell (disc diameter: 1 inch) was then measured. Fluids tested were (1) a 2% KCl brine having a fluid density of 8.37 ppg; (2) 100 parts per thousand gallons of hydroxyethyl cellulose (HEC) having a weight average molecular weight of 90,000 in 2% KCl brine, fluid density: 8.37 ppg and a viscosity of 7 cps @ 511 sec$^{-1}$; and (3) 3 gallons of trimethyloctadecylammonium chloride and 3 gallons of sodium xylene sulfonate per thousand gallons of fresh water, fluid density: 8.34 ppg and a viscosity between 6 to 7 cps @ 511 sec$^{-1}$. The method was conducted in accordance with the 36 minutes API Fluid Loss Test, ISO/DOS 13503-4. Results are set forth in Tables I, II and III, respectively.

TABLE I

2% KCl brine

| Time (minutes) | Square Root Time | Fluid Vol. (cc) |
|---|---|---|
| 1 | 1.0 | 19.73 |
| 2 | 1.4 | 39.86 |
| 4 | 2.0 | 78.52 |
| 6 | 2.4 | 115.88 |
| 9 | 3.0 | 170.29 |
| 12 | 3.5 | 223.40 |
| 16 | 4.0 | 292.25 |
| 17 | 4.1 | 309.29 |
| 18 | 4.2 | 0.00 |
| 20 | 4.5 | 0.00 |

Spurt Loss: 10.13 gal/ft$^2$
Leakoff Coefficient: −0.1025 ft/min$^{1/2}$

TABLE II

HEC in 2% KCl brine

| Time (minutes) | Square Root Time | Fluid Vol. (cc) |
|---|---|---|
| 1 | 1.0 | 71.64 |
| 2 | 1.4 | 108.91 |
| 4 | 2.0 | 176.86 |
| 6 | 2.4 | 194.40 |
| 9 | 3.0 | 199.38 |
| 12 | 3.5 | 203.97 |
| 16 | 4.0 | 209.65 |
| 17 | 4.1 | 211.04 |
| 18 | 4.2 | 212.34 |
| 20 | 4.5 | 215.03 |
| 22 | 4.7 | 217.52 |
| 25 | 5.0 | 221.20 |
| 30 | 5.5 | 227.08 |
| 33 | 5.7 | 230.47 |
| 36 | 6.0 | 233.66 |

Spurt Loss: 5.86 gal/ft$^2$
Leakoff Coefficient: 0.0667 ft/min$^{1/2}$

TABLE III

Trimethyloctadecylammonium chloride/sodium xylene sulfonate (3/3) in Fresh Water

| Time (minutes) | Square Root Time | Fluid Vol. (cc) |
|---|---|---|
| 1 | 1.0 | 31.40 |
| 2 | 1.4 | 40.30 |
| 4 | 2.0 | 51.90 |
| 6 | 2.4 | 60.80 |
| 9 | 3.0 | 71.70 |
| 12 | 3.5 | 81.20 |
| 16 | 4.0 | 90.00 |
| 17 | 4.1 | 91.90 |
| 18 | 4.2 | 93.60 |
| 20 | 4.5 | 96.90 |
| 22 | 4.7 | 99.90 |
| 25 | 5.0 | 103.90 |
| 30 | 5.5 | 109.80 |
| 33 | 5.7 | 112.80 |
| 36 | 6.0 | 115.60 |

Spurt Loss: 1.02 gal/ft$^2$
Leakoff Coefficient: 0.0534 ft/min$^{1/2}$

FIG. 1 graphically displays the results tabulated above. FIG. 1 shows that fluid loss during fracturing can be controlled by filtrate viscosity. For instance, after 16 minutes of being introduced into the core, the fluid loss evident in a 2% KCl brine was about 310 cc of test fluid versus approximately 90 cc of test fluid containing sodium xylene sulfonate and trimethyloctadecylammonium chloride. Further, as depicted in FIG. 1, uncontrolled fluid loss occurs in the test fluid containing only 2% KCl brine and filter cake build-up. The curve for low MW HEC demonstrates filter cake formation prior to the take-over of filtrate viscosity control. (The inflection is indicative of the termination of the filter cake formation.) The line graph of the trimethyloctadecylammonium chloride and sodium xylene sulfonate test solution shows improved fluid loss control via the filtrate viscosity. Filter cake formation is not evident. Thus, both the HEC and trimethyloctadecylammonium chloride/sodium xylene sulfonate exhibited lower fluid volume loss leakage The use of HEC for viscosifying agent renders a build up of filter cake much faster than use of trimethyloctadecylammonium chloride/sodium xylene sulfonate as viscosifying agent, as evident by the slope. Further, once filter cake formation terminates for the HEC containing test sample, the slope of the line graph approximates the slope of the line graph of the trimethyloctadecylammonium chloride and sodium xylene sulfonate. This is indicative of viscous control by the filtrate.

From the foregoing, it will be observed that numerous variations and modifications may be effected without departing from the true spirit and scope of the novel concepts of the invention.

What is claimed is:

1. A method of reducing fluid loss during hydraulic fracturing or a sand control treatment of a subterranean reservoir comprising:
    (a) introducing into the reservoir a fluid comprising at least one proppant or sand control particulate and a filtrate having a viscosity less than 50 CP at 170 sec$^{-1}$, and
    (b) flowing the fluid through the matrix of the reservoir while minimizing the formation of filter cake
    wherein,
    (i) the filtrate comprises an aqueous medium and a viscosifying agent having a weight average molecular weight less than about 250,000,
    (ii) the amount of viscosifying agent in the filtrate is between from about 0.01 to about 10 weight percent, and
    (iii) the relative permeability of the reservoir is less than 10 mD.

2. The method of claim 1, wherein the viscosity of the filtrate is less than about 10 CP at 170 sec$^{-1}$.

3. The method of claim 1, wherein the aqueous medium is slickwater.

4. The method of claim 3, wherein the weight average molecular weight of the viscosifying agent is less than 40,000.

5. The method of claim 1, wherein the weight average molecular weight of the viscosifying agent is less than 60,000.

6. The method of claim 1, wherein the particulate is an ultra lightweight (ULW) particulate having an apparent specific gravity less than or equal to 2.45.

7. The method of claim 6, wherein the apparent specific gravity of the ULW particulate is less than 1 75.

8. The method of claim 1, wherein the viscosifying agent is selected from the group consisting of hydroxyethyl cellulose, carboxymethylhydroxyethyl cellulose, hydroxypropyl cellulose, ethylhydroxyethyl cellulose and carboxymethyl cellulose, polyethylene oxide and depolymerized guar.

9. The method of claim 1, wherein the viscosifying agent is a viscoelastic gel.

10. The method of claim 9, wherein the viscosifying agent comprises an anionic surfactant and a cationic surfactant.

11. The method of claim 10, wherein the viscosifying agent comprises sodium xylenesulfonate and N,N,N-trimethyl-1-octadecammonium chloride 12. A method of reducing fluid loss during hydraulic fracturing or a sand control treatment of a reservoir having a relative permeability of less than about 10 mD, comprising:
    (a) providing a fluid comprising at least one proppant or sand control particulate and a filtrate having a viscosity of less than 50 CP at 170 sec$^{-1}$, the filtrate comprising:
        (i) slickwater, and
        (ii) viscosifying agent, and
    (b) introducing the fluid into the reservoir wherein the viscosifying agent is of a size sufficient to flow through the pore throat of the reservoir and into the matrix of the reservoir.

13. The method of claim 12, wherein the relative permeability of the reservoir is from less than about 1.0 mD to about 10 mD.

14. The method of claim 12, wherein the weight average molecular weight of the viscosifying agent is less than 60,000.

15. The method of claim 14, wherein the weight average molecular weight of the viscosifying agent is less than 40,000.

16. The method of claim 12, wherein the viscosifying agent is a viscoelastic gel.

17. The method of claim 12, wherein the apparent specific gravity of the proppant or sand control particulate is less than or equal to 1 75.

18. A method of reducing fluid loss during hydraulic fracturing or a sand control treatment of a reservoir having a relative permeability of less than or equal to 10 mD, comprising:
    (a) providing a fluid comprising:
        (i) slickwater,
        (ii) at least one ultra lightweight (ULW) proppant or sand control particulate wherein the apparent specific gravity of the ULW proppant or sand control particulate is less than or equal to 2.45, and
        (iii) a viscosifying agent having a weight average molecular weight less than about 250,000,
    (b) introducing the fluid into the reservoir, and
    (c) flowing the fluid through the matrix of the reservoir.

19. The method of claim 18, wherein the apparent specific gravity of the ULW proppant or sand control particulate is less than 1 75.

20. The method of claim 18, wherein the permeability of the reservoir is between from about 0 001 to about 1 0 mD.

21. A method of reducing fluid loss during hydraulic fracturing or a sand control treatment of a formation, comprising
    (a) providing a fluid comprising an ultra lightweight proppant or sand control particulate having an apparent specific gravity less than or equal to 2.45 and a filtrate having a viscosity of less than 50 CP at 170 sec$^{-1}$, the filtrate comprising slickwater and
    viscosifying agent having a weight average molecular weight less than about 250,000, and
    (b) introducing the fluid into a reservoir, wherein the relative permeability of the reservoir is less than 1 0 mD, and
    (c) flowing the fluid through the matrix of the reservoir while minimizing the formation of filter cake.

22. The method of claim 21, wherein the weight average molecular weight of the viscosifying agent is less than 40,000.

* * * * *

UNITED STATES PATENT AND TRADEMARK OFFICE
CERTIFICATE OF CORRECTION

PATENT NO. : 7,699,106 B2
APPLICATION NO. : 11/706030
DATED : April 20, 2010
INVENTOR(S) : Brannon et al.

It is certified that error appears in the above-identified patent and that said Letters Patent is hereby corrected as shown below:

Column 8, lines 3-6 should read:

(b) introducing the fluid into the reservoir
wherein the viscosifying agent is of a size sufficient to
flow through the pore throat of the reservoir and into the
matrix of the reservoir.

Column 8, line 39 should read:

the reservoir is between from about 0.001 to about 1.0 mD.

Column 8, line 51 should read:

tive permeability of the reservoir is less than 1.0 mD, and

Signed and Sealed this

Fifteenth Day of June, 2010

David J. Kappos
*Director of the United States Patent and Trademark Office*